US012755128B2

(12) United States Patent
Kato

(10) Patent No.: US 12,755,128 B2
(45) Date of Patent: Oct. 6, 2026

(54) RFID TAG

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 19/090,933

(22) Filed: Mar. 26, 2025

(65) Prior Publication Data

US 2025/0225362 A1 Jul. 10, 2025

Related U.S. Application Data

(63) Continuation of application No. PCT/JP2023/043158, filed on Dec. 1, 2023.

(30) Foreign Application Priority Data

Dec. 12, 2022 (JP) ................................ 2022-197889

(51) Int. Cl.
*G06K 19/077* (2006.01)
*G06K 19/07* (2006.01)

(52) U.S. Cl.
CPC ... *G06K 19/07775* (2013.01); *G06K 19/0723* (2013.01); *G06K 19/07779* (2013.01)

(58) Field of Classification Search
CPC ......... G06K 19/07775; G06K 19/0723; G06K 19/07779
USPC .......................................................... 235/492
See application file for complete search history.

(56) References Cited

U.S. PATENT DOCUMENTS 8,981,906 B2 * 3/2015 Takeoka ................. H01Q 5/371 343/834
11,954,552 B2 4/2024 Hasegawa
2011/0024510 A1 * 2/2011 Kato ................ G06K 19/07784 235/492

(Continued)

FOREIGN PATENT DOCUMENTS

JP 2008-244740 A 10/2008
WO 2021/085269 A1 5/2021

OTHER PUBLICATIONS

International Search Report received for PCT Patent Application No. PCT/JP2023/043158, mailed on Feb. 13, 2024, 2 pages (English Translation Only).

*Primary Examiner* — Michael G Lee
*Assistant Examiner* — David Tardif
(74) *Attorney, Agent, or Firm* — ArentFox Schiff LLP

(57) ABSTRACT

An RFID tag is provided that includes a base material that includes a first and second surfaces, a coil conductor that includes first and second spiral conductors provided on the first and second surfaces of the base material, respectively, an RFIC chip provided on the base material such that the RFIC chip is positioned in an opening of the coil conductor in plan view of the base material, and first and second connection conductors provided on the first and second surfaces of the base material, respectively. The first and second connection conductors electrically connect first and second spiral conductors and the RFIC chip. Moreover, the first connection conductor and the second connection conductor at least partially overlap each other in the plan view of the base material.

8 Claims, 9 Drawing Sheets

(56) References Cited

U.S. PATENT DOCUMENTS

| | | | | |
|---|---|---|---|---|
| 2015/0001305 | A1* | 1/2015 | Dokai | H01Q 1/2225<br>235/488 |
| 2016/0241306 | A1 | 8/2016 | Moon et al. | |
| 2022/0398389 | A1* | 12/2022 | Hasegawa | G06K 19/07784 |

* cited by examiner

FIRST COMPARATIVE EXAMPLE

FIRST EXAMPLE

SECOND COMPARATIVE EXAMPLE

SECOND COMPARATIVE EXAMPLE

SECOND EXAMPLE

SECOND EXAMPLE

RFID TAG

CROSS REFERENCE TO RELATED APPLICATIONS

This application is a continuation of International Application No. PCT/JP2023/043158, filed Dec. 1, 2023, which claims priority to Japanese Patent Application No. 2022-197889, filed Dec. 12, 2022, the contents of each of which are hereby incorporated by reference in their entirety.

TECHNICAL FIELD

The present disclosure relates to an RFID tag.

BACKGROUND

Japanese Application No. 2008-244740 describes an RFID tag including an RFIC chip, and a coil conductor electrically connected to the RFIC chip and that is used as an antenna. As described therein, the RFIC chip is disposed in an opening of the coil conductor.

In the RFID tag described in Japanese Application No. 2008-244740, a first connection conductor that electrically connects one end of the coil conductor and the RFIC chip, and a second connection conductor that electrically connects another end of the coil conductor and the RFIC chip, extend in opposite directions, respectively, from the RFIC chip. In this case, a magnetic flux generated by current flowing through the first connection conductor, the RFIC chip, and the second connection conductor, as well as part of a magnetic flux generated by current flowing through the coil conductor and passing through the opening of the coil conductor, cancel each other out. As a result, the communication distance of the RFID tag is shortened.

SUMMARY OF THE INVENTION

In view of the foregoing, the exemplary aspects of the present disclosure provide an RFID tag that includes a coil conductor and an RFIC chip disposed in an opening of the coil conductor. With the RFID tag, a communication distance is prevented from being decreased while the coil conductor and the RFIC chip are electrically connected.

According to one exemplary aspect of the present disclosure, an RFID tag is provided that includes a base material that includes a first surface and a second surface opposite to the first surface; a coil conductor that includes a first spiral conductor on the first surface of the base material, a second spiral conductor on the second surface of the base material, and an interlayer connection conductor extending through the base material and electrically connecting one end of the first spiral conductor and one end of the second spiral conductor; an RFIC chip on the base material such that the RFIC chip is positioned in an opening of the coil conductor in plan view of the base material, and that includes a first terminal and a second terminal; a first connection conductor that is provided on the first surface of the base material, and electrically connects another end of the first spiral conductor and the first terminal of the RFIC chip; and a second connection conductor that is provided on the second surface of the base material, and electrically connects another end of the second spiral conductor and the second terminal of the RFIC chip. In this aspect, the first connection conductor and the second connection conductor at least partially overlap each other in the plan view of the base material.

According to the exemplary aspects of the present disclosure, with the RFID tag including the coil conductor and the RFIC chip disposed in the opening of the coil conductor, the communication distance can be prevented from decreasing while electrically connecting the coil conductor and the RFIC chip.

DETAILED DESCRIPTION

Hereinafter, exemplary embodiments of the present disclosure will be described with reference to the drawings.

First Exemplary Embodiment

Figure 1:
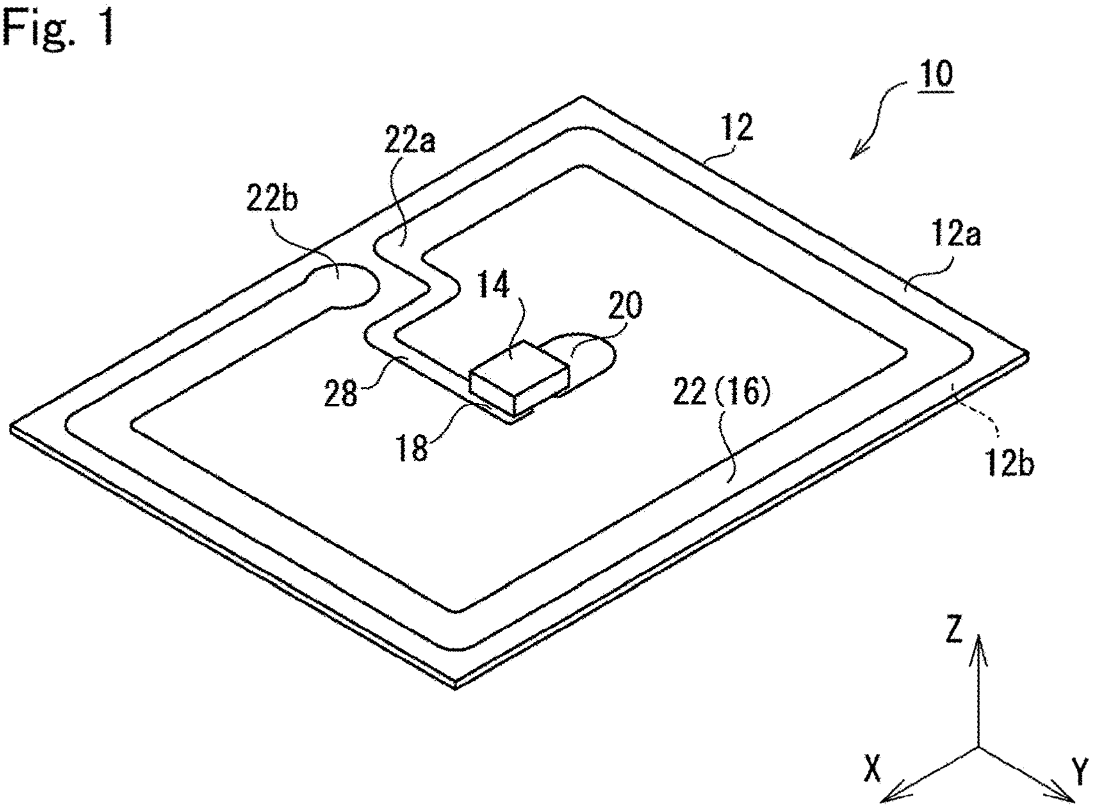
FIG. 1 is a perspective view of an RFID tag according to a first exemplary embodiment of the present disclosure.
Figure 2:
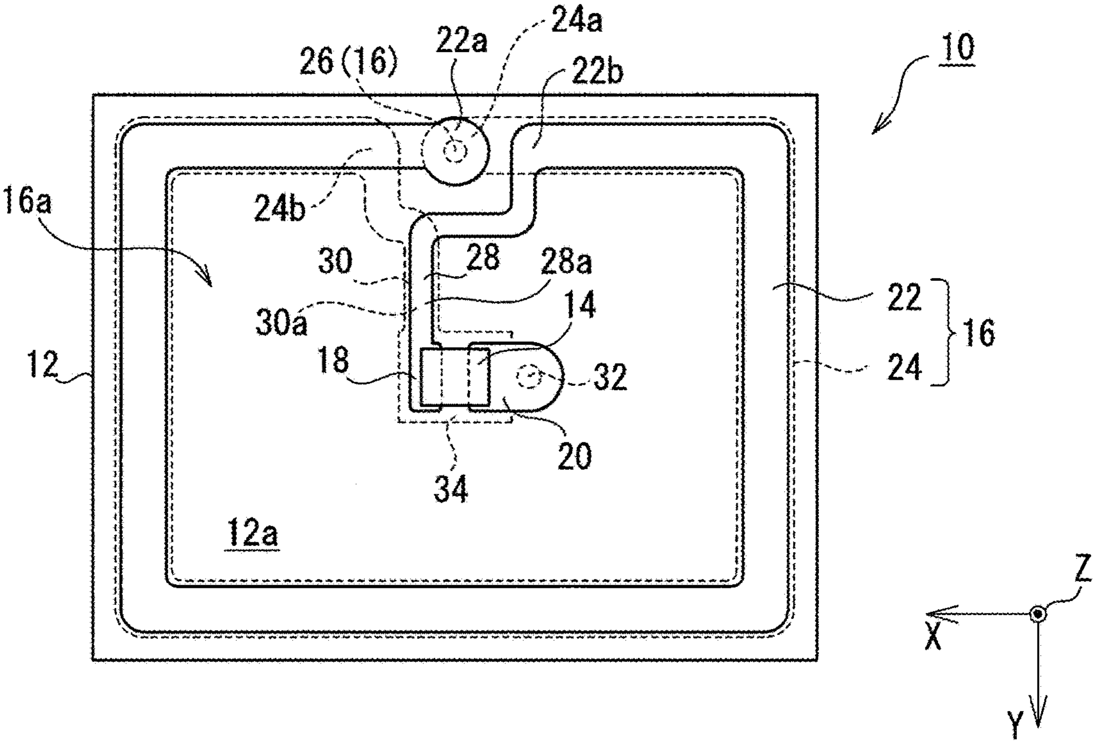
FIG. 2 is a top view of the RFID tag according to the first exemplary embodiment.
Figure 3:
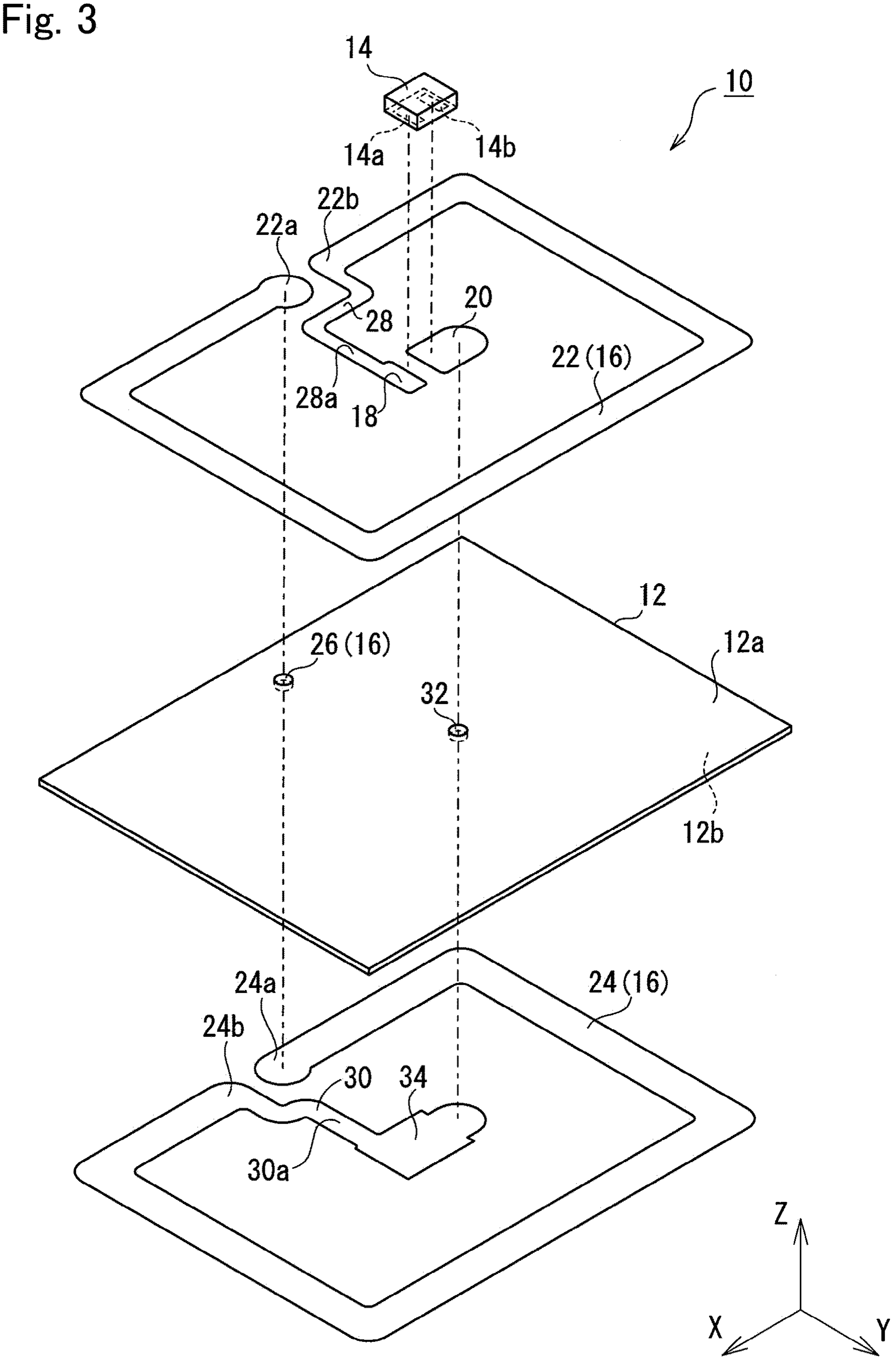
FIG. 3 is an exploded perspective view of the RFID tag according to the first exemplary embodiment.

FIG. 1 is a perspective view of an RFID tag according to a first exemplary embodiment of the present disclosure. FIG. 2 is a top view of the RFID tag according to the first embodiment. FIG. 3 is an exploded perspective view of the RFID tag according to the first embodiment. It is noted that an X-Y-Z orthogonal coordinate system in the drawings is provided to facilitate understanding of the present disclosure, and does not limit the present disclosure. In this aspect, an X-axis direction indicates a width direction of an RFID tag, a Y-axis direction indicates a depth direction, and a Z-axis direction indicates a thickness direction.

As illustrated in FIG. 1 to FIG. 3, a radio frequency identification (RFID) tag 10 according to the first embodiment includes a base material 12, a radio frequency integrated circuit (RFIC) chip 14 provided on (e.g., disposed on) the base material 12, and a coil conductor 16 electrically connected to the RFIC chip 14.

The base material 12 is a sheet-like member made of an insulating material, and includes a first surface 12_a_ and a second surface 12_b_ that is a surface opposite to the first surface 12*a*. That is, the first surface 12*a* and the second surface 12*b* form opposing surfaces of the base material 12 as shown in FIG. 3.

In the exemplary aspect, the RFIC chip 14 is configured to perform wireless communication with an external device using the coil conductor 16. The RFIC chip 14 includes first and second terminals 14*a* and 14*b* electrically connected to the coil conductor 16.

In the case of the first embodiment, the RFIC chip 14 is provided on the first surface 12*a* of the base material 12. Specifically, the first surface 12*a* of the base material 12 is provided with a first land conductor 18 electrically connected to one end of the coil conductor 16, and a second land conductor 20 electrically connected to another end of the coil conductor 16. These first and second land conductors 18 and 20 are, for example, conductor patterns.

The first terminal 14*a* of the RFIC chip 14 faces the first land conductor 18, and is fixed while electrically connected to the first land conductor 18 via, for example, a solder material. The second terminal 14*b* of the RFIC chip 14 faces the second land conductor 20, and is fixed while electrically connected to the second land conductor 20 via, for example, a solder material.

In operation, the coil conductor 16 is configured to function as an antenna when the RFIC chip 14 performs wireless communication with an external device.

In the case of the first embodiment, the coil conductor 16 includes a first spiral conductor 22 provided on the first surface 12*a* of the base material 12, and a second spiral conductor 24 provided on the second surface 12*b* of the base material 12. The first spiral conductor 22 and the second spiral conductor 24 partially overlap each other in plan view (when viewed in the Z-axis direction) of the base material 12. These first and second spiral conductors 22 and 24 are, for example, conductor patterns according to the exemplary aspect.

In the case of the first embodiment, the coil conductor 16 includes an interlayer connection conductor 26, such as a through-hole conductor, that extends through the base material 12 in the thickness direction (Z-axis direction), and that electrically connects one end 22*a* of the first spiral conductor 22 and one end 24*a* (e.g., a first end) of the second spiral conductor 24.

As illustrated in FIG. 2, the RFIC chip 14, the first land conductor 18, and the second land conductor 20 are arranged in an opening 16*a* of the coil conductor 16 in plan view (when viewed in the Z-axis direction) of the base material 12. In particular, the RFIC chip 14 is disposed in a center of the opening 16*a*.

A first connection conductor 28 is provided on the first surface 12*a* of the base material 12 in order to electrically connect another end 22*b* of the first spiral conductor 22 in the coil conductor 16, and the first land conductor 18. The first connection conductor 28 is, for example, a conductor pattern.

A second connection conductor 30 is provided on the second surface 12*b* of the base material 12 in order to electrically connect another end 24*b* (e.g., a second end) of the second spiral conductor 24 in the coil conductor 16, and the second land conductor 20. The second connection conductor 30 is, for example, a conductor pattern.

These first and second connection conductors 28 and 30 enable the RFIC chip 14 and the coil conductor 16 to be electrically connected.

As shown in FIG. 2, the first connection conductor 28 and the second connection conductor 30 are provided, respectively, on the first and second surfaces 12*a* and 12*b* of the base material 12 so as to at least partially overlap each other in plan view (when viewed in the Z-axis direction) of the base material 12. More preferably, the first and second connection conductors 28 and 30 are provided on the base material 12 such that as many portions of the respective conductors as possible overlap each other. In the case of the first embodiment, respective portions 28*a* and 30*a* overlapping each other, of the first connection conductor 28 and the second connection conductor 30, extend linearly in an identical direction. The technical effect for why the first connection conductor 28 and the second connection conductor 30 are partially overlapped with each other will be described later.

In the case of the first embodiment, a land support conductor 34 that supports the first land conductor 18 and the second land conductor 20 is provided on the second surface 12*b* of the base material 12. In the case of the first embodiment, the land support conductor 34 is a part of the second connection conductor 30.

The land support conductor 34 overlaps both the first land conductor 18 and the second land conductor 20 in plan view (when viewed in the Z-axis direction) of the base material 12. That is, the first land conductor 18 and the second land conductor 20 are positioned inside a contour of the land support conductor 34 in plan view of the base material 12.

This land support conductor 34 is configured to restrain occurrence of disconnection of an electrical connection between the first and second land conductors 18 and 20 and the RFIC chip 14. In particular, the second spiral conductor 24 present on the surface 12*b* of the base material 12 has a certain conductor thickness (20 μm thick, for example), and this thickness causes the first and second land conductors 18 and 20 to float in air. However, with presence of the land support conductor 34, the first and second land conductors 18 and 20 are flush with each other and thus prevented from floating in the air. Hence, in the case of solder connection, solder is applied without the base material 12 being deflected depending on a pressure condition of a solder squeegee, so that a connection failure between the RFIC chip 14 and the first and second land conductors 18 and 20 does not occur.

According to the exemplary aspect, when the RFID tag 10 is attached to a surface of an object on the second surface 12*b* of the base material 12, with the presence of the land support conductor 34, a distance from the first land conductor 18 to the object is equal to the distance from the second land conductor 20 to the object. The RFID tag 10 can thus be attached to the object without the RFIC chip 14 tilting.

In contrast, when the land support conductor 34 is not present, due to the conductor thickness of the second spiral conductor 24 present on the surface 12*b* of the base material 12, the first and second land conductors 18 and 20 are connected to the RFIC chip 14 while floating in the air. Thus, levels of the first and second land conductors 18 and 20 cannot be kept constant. In the case of solder connection, solder is applied while the base material 12 is deflected depending on a pressure condition of a solder squeegee, so that an amount of solder becomes uneven, and, as a result, a connection failure between the RFIC chip 14 and the first and second land conductors 18 and 20 occurs. A similar connection failure may occur also in the case of IC connection under load, such as ACP connection and ultrasonic welding.

Moreover, when the RFID tag 10 is attached to a surface of an object on the second surface 12*b* of the base material 12, the second land conductor 20 faces the second connection conductor 30 while no conductor facing the first land conductor 18 is present on the second surface 12*b* of the base material 12. This causes the RFIC chip 14 to tilt when the RFID tag 10 is attached to the surface of the object. The reason is that due to the absence of the land support conductor 34, the distance from the first land conductor 18 to the object is smaller than the distance from the second land conductor 20 to the object. The tilting of the RFIC chip 14 may disconnect the electrical connection between the second terminal 14*b* and the second land conductor 20, for example.

The configuration of the RFID tag 10 according to the first embodiment has been described above. The technical effect for why the first connection conductor 28 and the second connection conductor 30 are at least partially overlapped with each other in plan view (when viewed in the Z-axis direction) of the base material 12, as shown in FIG. 2, will be described below.

Figure 4:
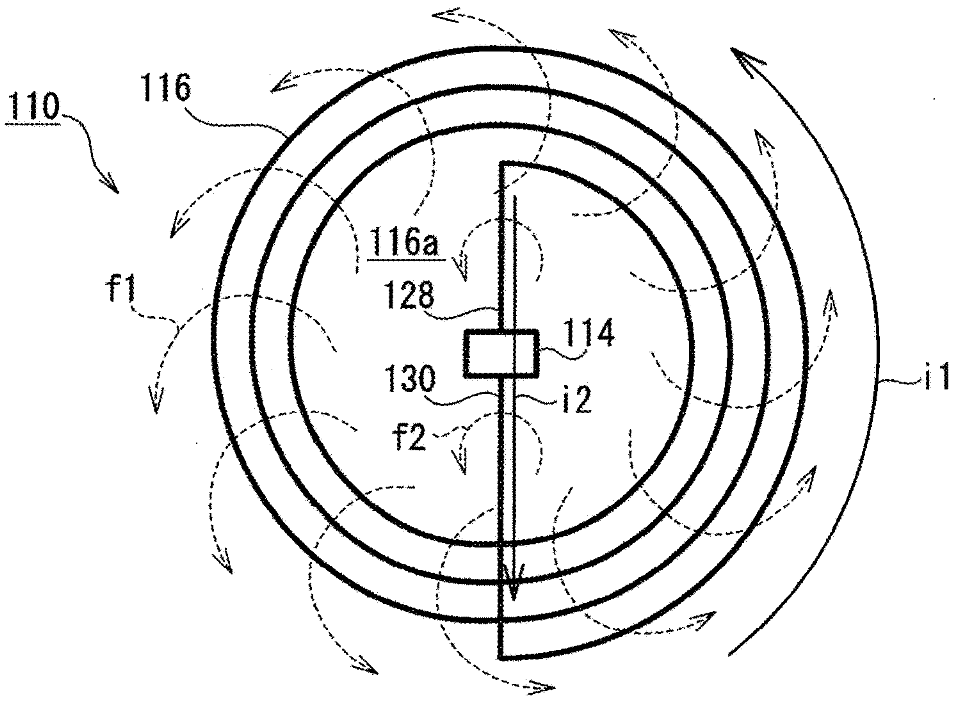
FIG. 4 is a schematic view of an RFID tag of a first comparative example.
Figure 5:
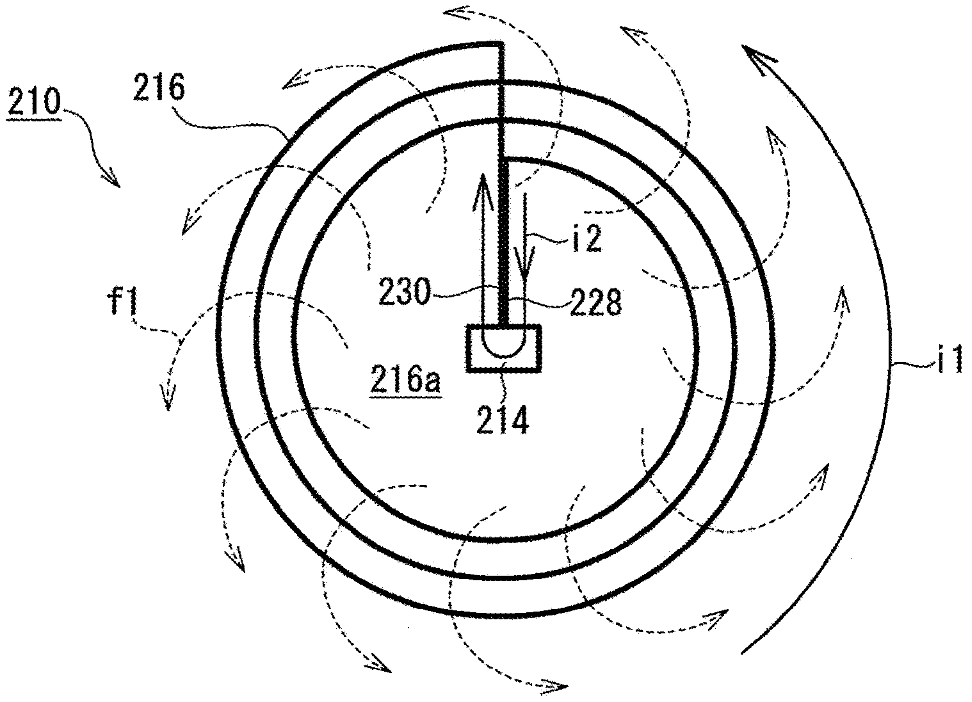
FIG. 5 is a schematic view of an RFID tag of a first example.

FIG. 4 is a schematic view of an RFID tag of a first comparative example. FIG. 5 is a schematic view of an RFID tag of a first example. The RFID tag shown in FIG. 5 corresponds to a simplified form of the RFID tag 10 according to the first embodiment shown in FIG. 1 to FIG. 3.

As shown in FIG. 4, an RFID tag 110 of the first comparative example includes a coil conductor 116 and an RFIC chip 114 disposed in an opening 116*a* of the coil conductor 116. The RFID tag 110 also includes a first connection conductor 128 that electrically connects one end (e.g., a first end) of the coil conductor 116 and the RFIC chip 114, and a second connection conductor 130 that electrically connects another end (e.g., a second end) of the coil conductor 116 and the RFIC chip 114. In the RFID tag 110 of the first comparative example, the first and second connection conductors 128 and 130 extend from the RFIC chip 114 in directions opposite to each other and do not overlap in plan view.

As shown in FIG. 4, in the RFID tag 110 of the comparative example, a current i1 flows through the coil conductor 116 to generate a magnetic flux f1. In addition, a magnetic flux f2 is generated by a current i2 flowing through the first connection conductor 128, the RFIC chip 114, and the second connection conductor 130. It is noted that the current i1 and the current i2 are the same current in the exemplary aspect.

The magnetic flux f2 generated by the current i2 flowing through the first connection conductor 128, the RFIC chip 114, and the second connection conductor 130, as well as part of the magnetic flux f1 passing through the opening 116*a* of the coil conductor 116, cancel each other out. As a result, a communication distance of the RFID tag 110 that performs wireless communication using the coil conductor 116 is shortened.

In an RFID tag 210 of the first example shown in FIG. 5, on the other hand, a first connection conductor 228 and a second connection conductor 230 linearly extend from an RFIC chip 214 in an identical direction, and partially overlap each other (since the first connection conductor 228 and the second connection conductor 230 cannot be distinguished when overlapping, FIG. 5 shows a non-overlapping state).

As shown in FIG. 5, in the RFID tag 210 of the first example, a current i1 flows through a coil conductor 216 to generate a magnetic flux f1. In addition, a magnetic flux is generated by a current i2 flowing through the first connection conductor 228, the RFIC chip 214, and the second connection conductor 230. Since, however, a direction of the current i2 flowing through the first connection conductor 228 and a direction of the current i2 flowing through the second connection conductor 230 are contrary to each other, a magnetic flux generated from the first connection conductor 228 and a magnetic flux generated from the second connection conductor 230 cancel each other out. As a result, the magnetic flux f1 passing through an opening 216*a* of the coil conductor 216 is substantially not canceled by the magnetic fluxes generated from the first and second connection conductors 228 and 230. A communication distance of the RFID tag 210 of the first example therefore increases as compared with the communication distance of the RFID tag 110 of the first comparative example.

Figure 6:
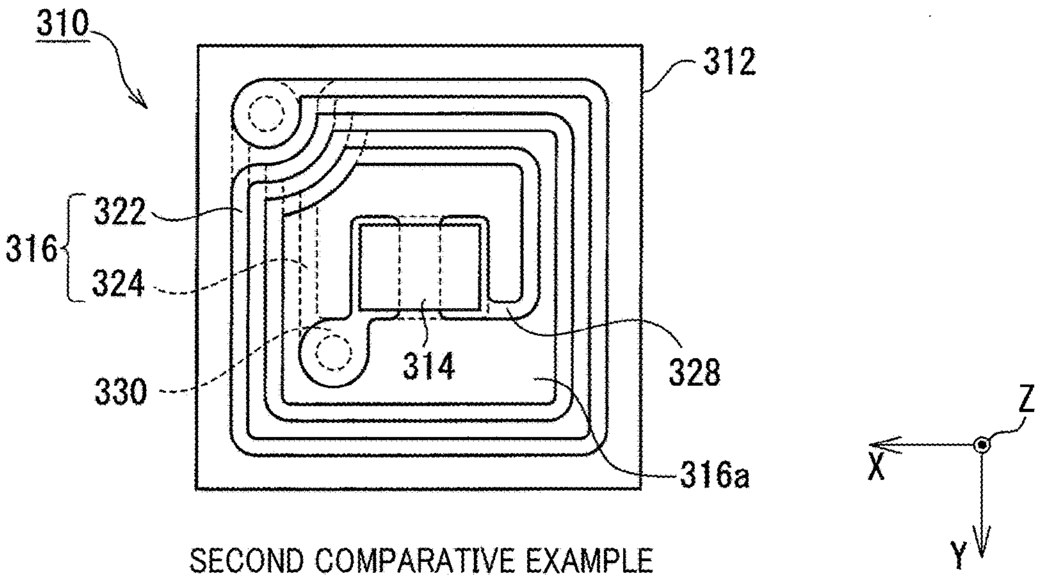
FIG. 6 is a top view of an RFID tag of a second comparative example.
Figure 7:
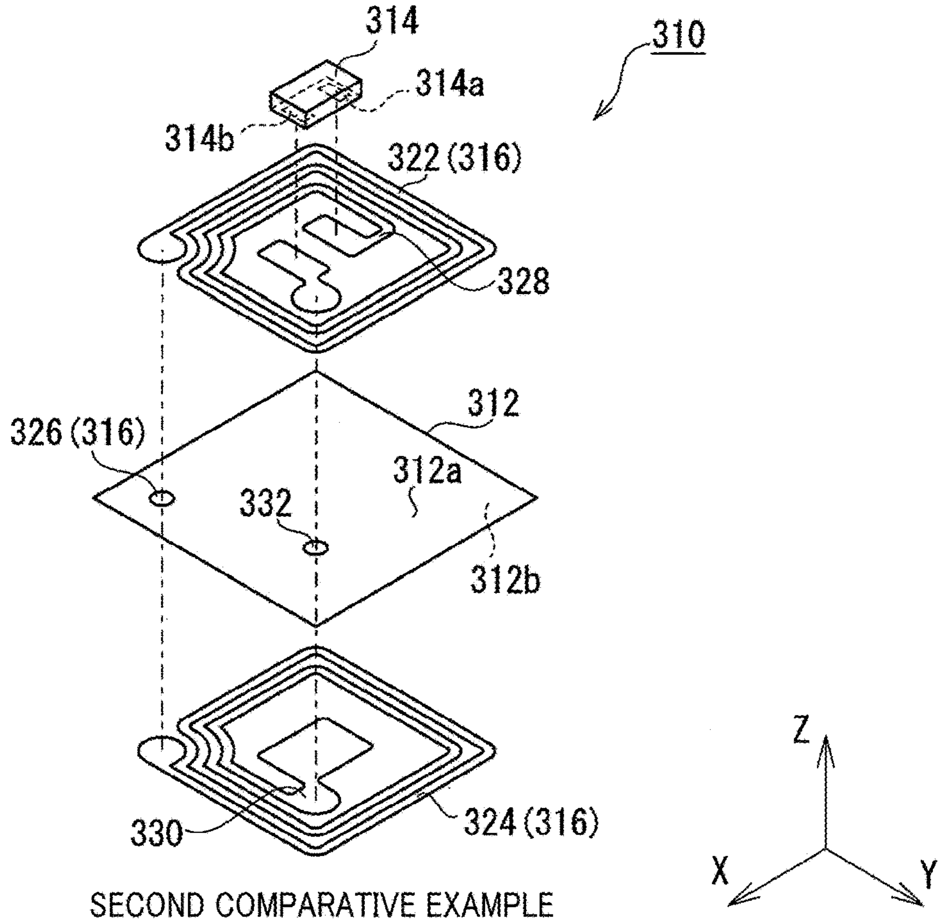
FIG. 7 is an exploded perspective view of the RFID tag of the second comparative example.
Figure 8:
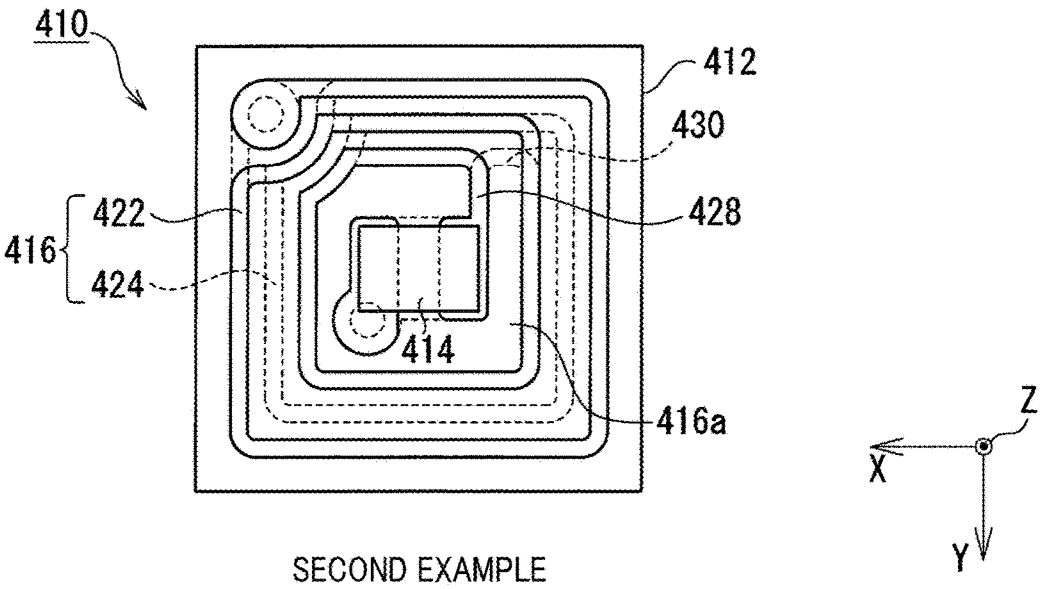
FIG. 8 is a top view of an RFID tag of a second example.
Figure 9:
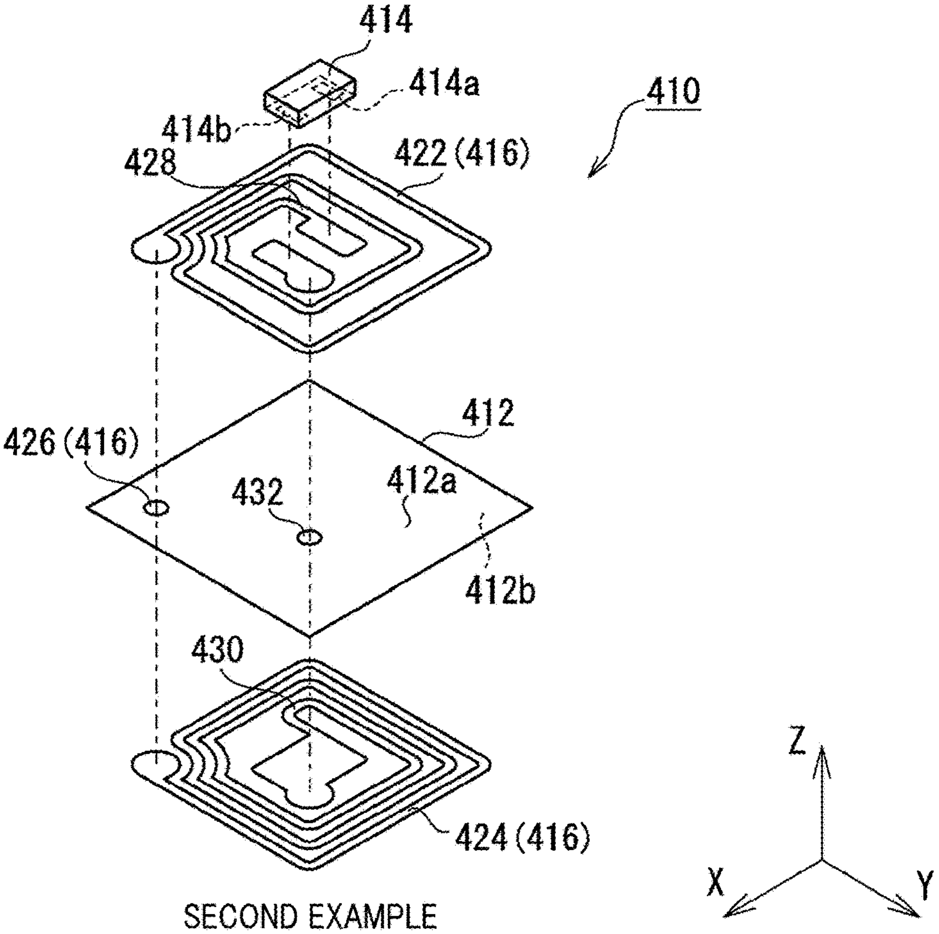
FIG. 9 is an exploded perspective view of the RFID tag of the second example.

FIG. 6 is a top view showing a model of an RFID tag of a second comparative example used for the simulation. FIG. 7 is an exploded perspective view showing the model of the RFID tag of the second comparative example. FIG. 8 is a top view showing a model of an RFID tag of a second example used for the simulation. FIG. 9 is an exploded perspective view showing the model of the RFID tag of the second example.

As shown in FIG. 6 and FIG. 7, in an RFID tag 310 of the second comparative example, a coil conductor 316 includes a first spiral conductor 322 provided on a first surface 312*a* of a base material 312, and a second spiral conductor 324 provided on a second surface 312*b*. The coil conductor 316 also includes an interlayer connection conductor 326 that electrically connects an outer end of the first spiral conductor 322 and an outer end of the second spiral conductor 324. An RFIC chip 314 is disposed in a center of an opening 316*a* of the coil conductor 316 in plan view (when viewed in the Z-axis direction) of the base material 312. Moreover, a first terminal 314*a* of the RFIC chip 314 is electrically connected to an inner end of the first spiral conductor 322 via a first connection conductor 328. A second terminal 314*b* of the RFIC chip 314 is electrically connected to an inner end of the second spiral conductor 324 via a second connection conductor 330 and an interlayer connection conductor 332.

As shown in FIG. 6, in the RFID tag 310 of the second comparative example, the first connection conductor 328 and the second connection conductor 330 do not overlap in plan view (when viewed in the Z-axis direction) of the base material 312.

As shown in FIG. 8 and FIG. 9, on the other hand, in an RFID tag 410 of the second example, a coil conductor 416 includes a first spiral conductor 422 provided on a first surface 412*a* of a base material 412, and a second spiral conductor 424 provided on a second surface 412*b*. The coil conductor 416 includes an interlayer connection conductor 426 that electrically connects an outer end of the first spiral conductor 422 and an outer end of the second spiral conductor 424. An RFIC chip 414 is disposed in a center of an opening 416*a* of the coil conductor 416 in plan view (when viewed in the Z-axis direction) of the base material 412. A first terminal 414*a* of the RFIC chip 414 is electrically connected to an inner end of the first spiral conductor 422 via a first connection conductor 428. A second terminal 414*b* of the RFIC chip 414 is electrically connected to an inner end of the second spiral conductor 424 via a second connection conductor 430 and an interlayer connection conductor 432.

As shown in FIG. 8, in the RFID tag 410 of the second example, the first connection conductor 428 and the second connection conductor 430 partially overlap each other in plan view (when viewed in the Z-axis direction) of the base material 412.

It is noted that the base material 312 and the RFIC chip 314 of the second comparative example are the same as the base material 412 and the RFIC chip 414 of the second example described above. In addition, the material of the conductor, such as the coil conductor 316, of the second comparative example can be the same as the material of the conductor, such as the coil conductor 416, of the second example. Under these conditions, the inventor performed the simulation to obtain respective communication distances of the RFID tag 310 of the second comparative example and the RFID tag 410 of the second example.

As a result of the simulation, the communication distance of the RFID tag 310 of the second comparative example was 10.5 mm, and the communication distance of the RFID tag 410 of the second example was 12.5 mm. This simulation result demonstrates that the communication distance of the RFID tag is improved when the first connection conductor and the second connection conductor at least partially overlap each other in plan view of the base material.

According to the first embodiment as described above, with the RFID tag 10 including the coil conductor 16 and the RFIC chip 14 disposed in the opening 16*a* of the coil conductor 16, the communication distance can be prevented from decreasing while electrically connecting the coil conductor 16 and the RFIC chip 14.

Second Exemplary Embodiment

Figure 10:
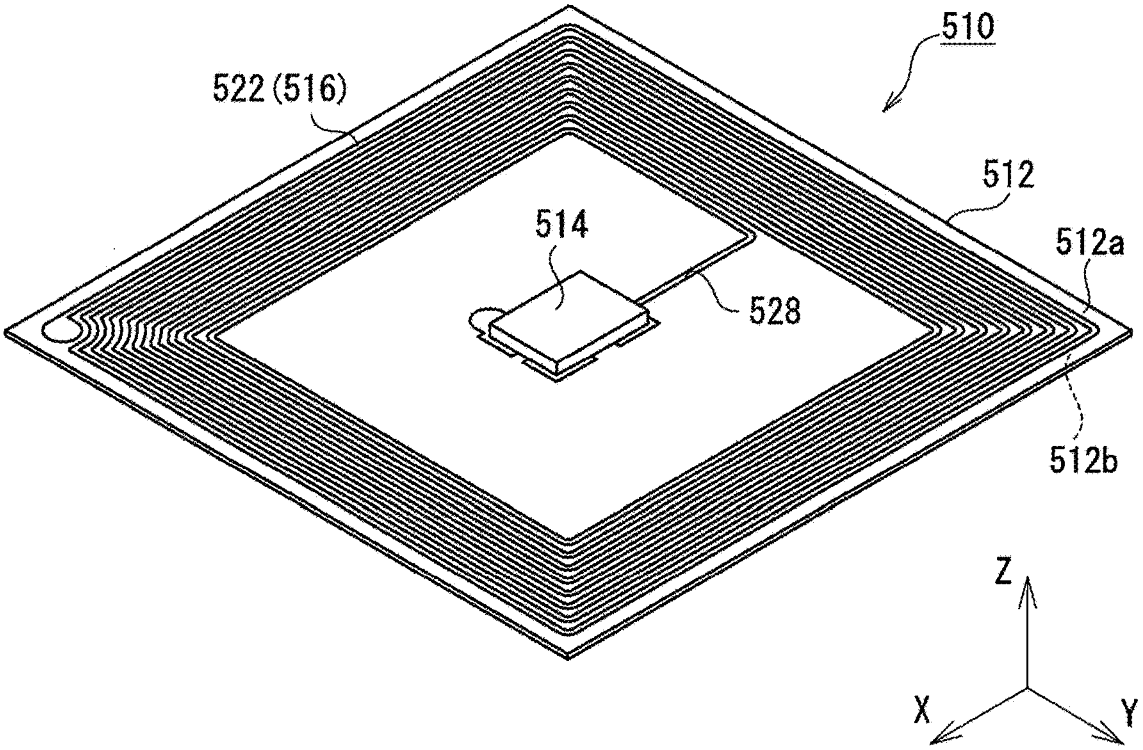
FIG. 10 is a perspective view of an RFID tag according to a second exemplary embodiment of the present disclosure.
Figure 11:
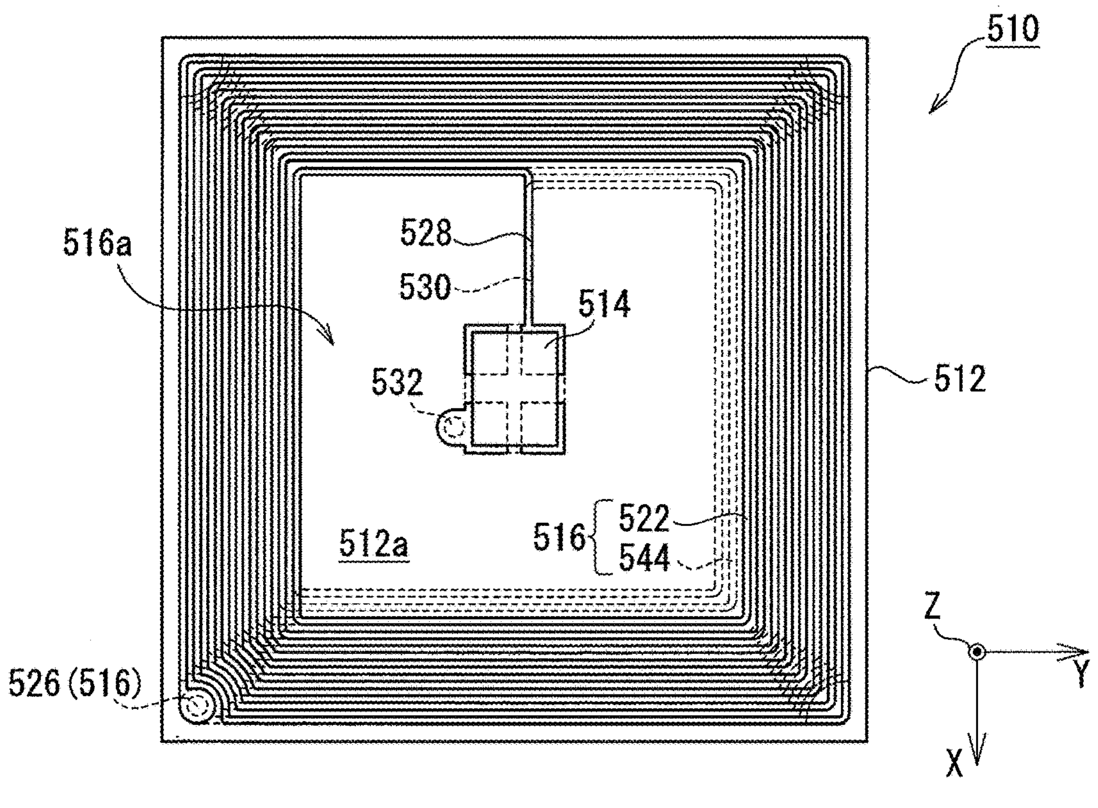
FIG. 11 is a top view of the RFID tag according to the second exemplary embodiment.
Figure 12:
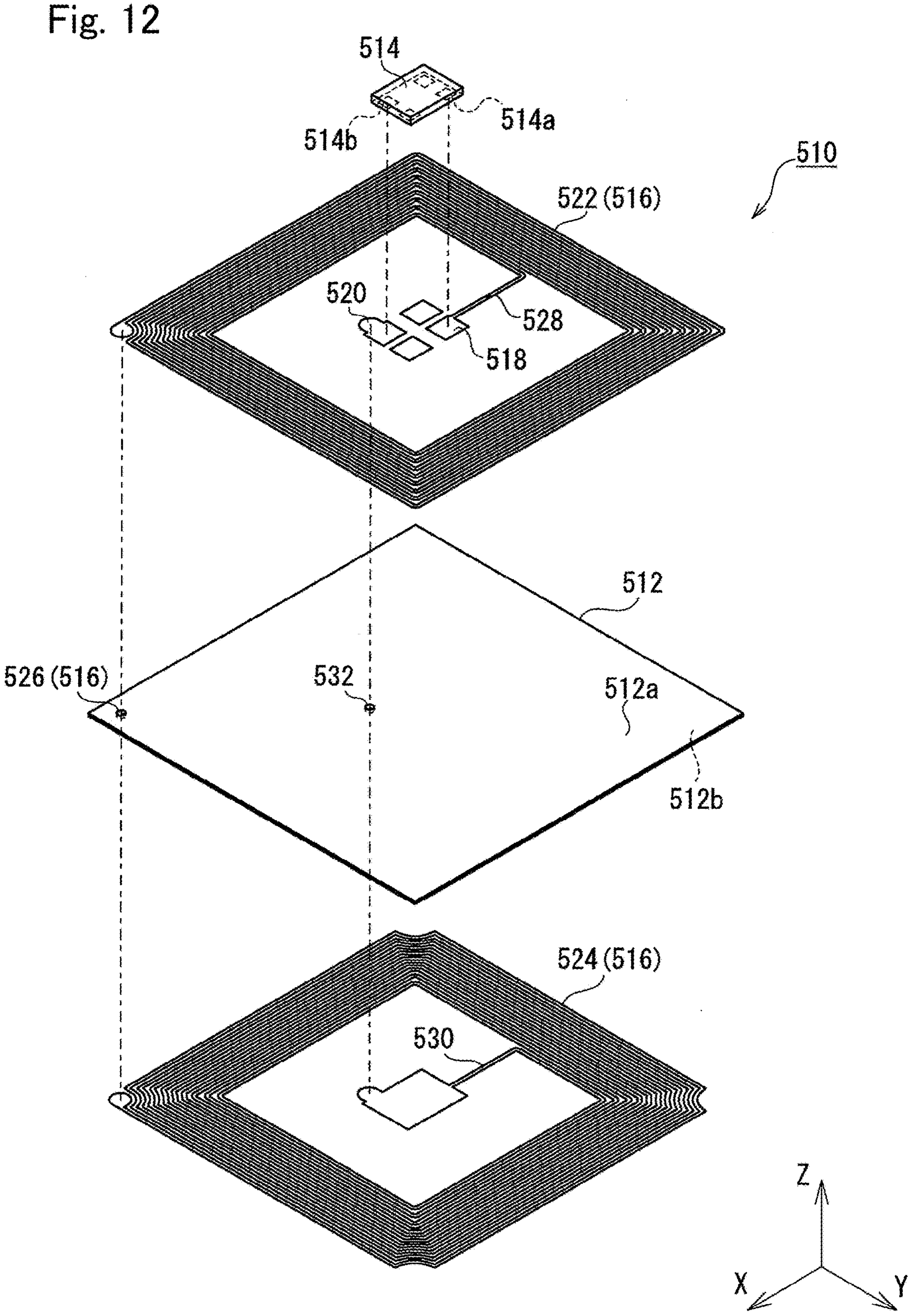
FIG. 12 is an exploded perspective view of the RFID tag according to the second exemplary embodiment.

FIG. 10 is a perspective view of an RFID tag according to a second embodiment of the present disclosure. FIG. 11 is a top view of the RFID tag according to the second embodiment. FIG. 12 is an exploded perspective view of the RFID tag according to the second embodiment.

As shown in FIG. 10 to FIG. 12, an RFID tag 510 according to the second embodiment includes a base material 512, an RFIC chip 514, and a coil conductor 516. The coil conductor 516 includes a first spiral conductor 522 provided on a first surface 512*a* of the base material 512, a second spiral conductor 524 provided on a second surface 512*b* of the base material 512, and an interlayer connection conductor 526 that electrically connects an outer end of the first spiral conductor 522 and an outer end of the second spiral conductor 524.

A first connection conductor 528 that electrically connects an inner end of the first spiral conductor 522 and a first terminal 514*a* of the RFIC chip 514, is provided on the first surface 512*a* of the base material 512. The first connection conductor 528 is electrically connected to the first terminal 514*a* of the RFIC chip 514 via a first land conductor 518.

A second connection conductor 530 that electrically connects an inner end of the second spiral conductor 524 and a second terminal 514*b* of the RFIC chip 514, is provided on the second surface 512*b* of the base material 512. The second connection conductor 530 is electrically connected to the second terminal 514*b* of the RFIC chip 514 via an interlayer connection conductor 532 and a second land conductor 520.

The first connection conductor 528 and the second connection conductor 530 overlap each other on the base material 512 in plan view (when viewed in the Z-axis direction). In the case of the second embodiment, the first connection conductor 528 and the second connection conductor 530 overlap each other in many portions.

Also with the RFID tag 510 of the second embodiment, as with the RFID tag 10 of the first embodiment, the communication distance can be prevented from decreasing while electrically connecting the coil conductor 516 and the RFIC chip 514.

The number of turns of the coil conductor 516 in the RFID tag 510 according to the second embodiment is larger than the number of turns of the coil conductor 16 in the RFID tag 10 according to the first embodiment. The reason is that communication frequencies of the RFID tag 10 of the first embodiment and the RFID tag 510 of the second embodiment are different, and thus required inductances of the coil conductors are different. In the case of the second embodiment, in order to finely adjust the inductance of the coil conductor 516 to an appropriate value, the first spiral conductor 522 in the coil conductor 516 has curved corner portions protruding toward a center, unlike the second spiral conductor 524.

Third Exemplary Embodiment

Figure 13:
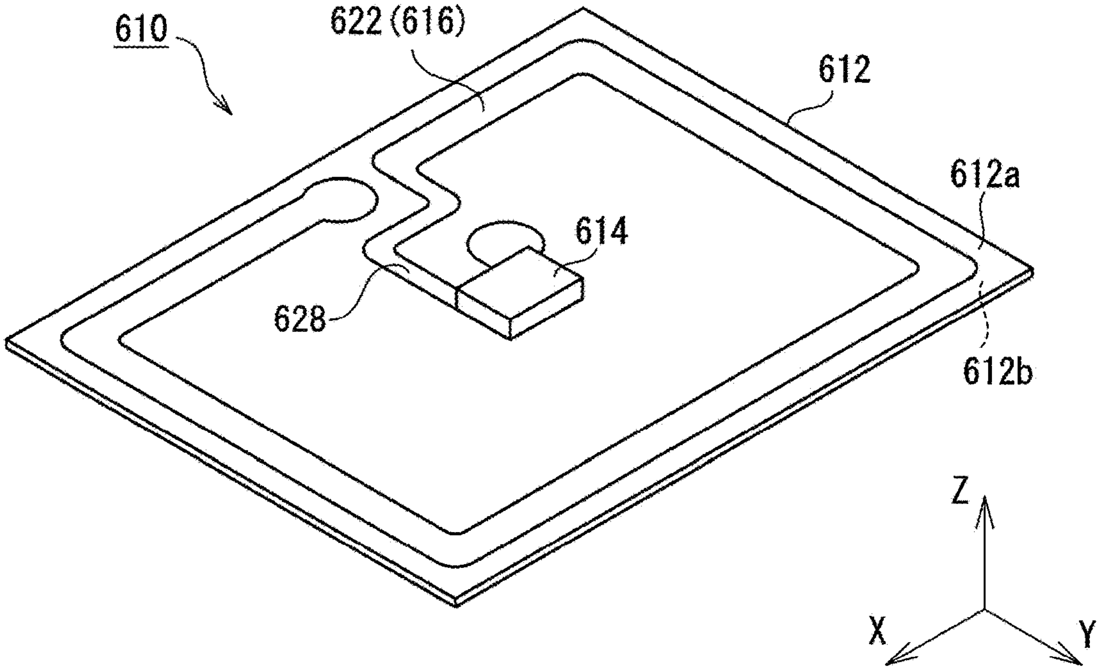
FIG. 13 is a perspective view of an RFID tag according to a third exemplary embodiment of the present disclosure.
Figure 14:
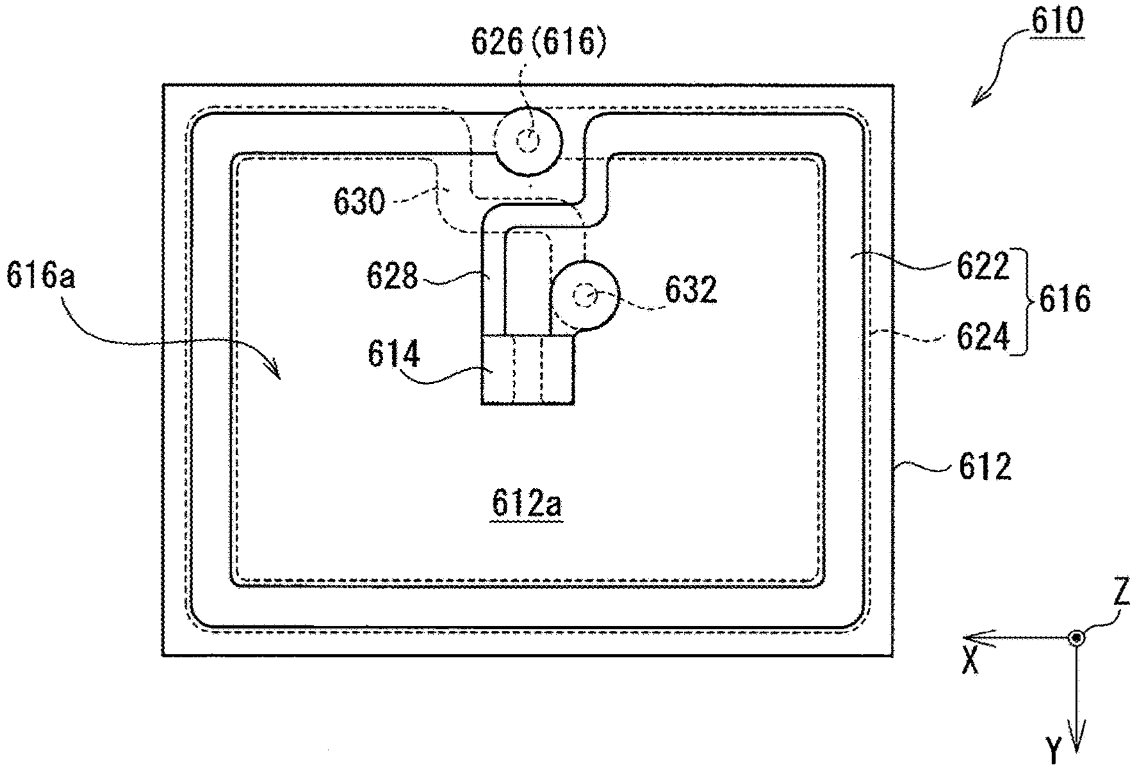
FIG. 14 is a top view of the RFID tag according to the third exemplary embodiment.
Figure 15:
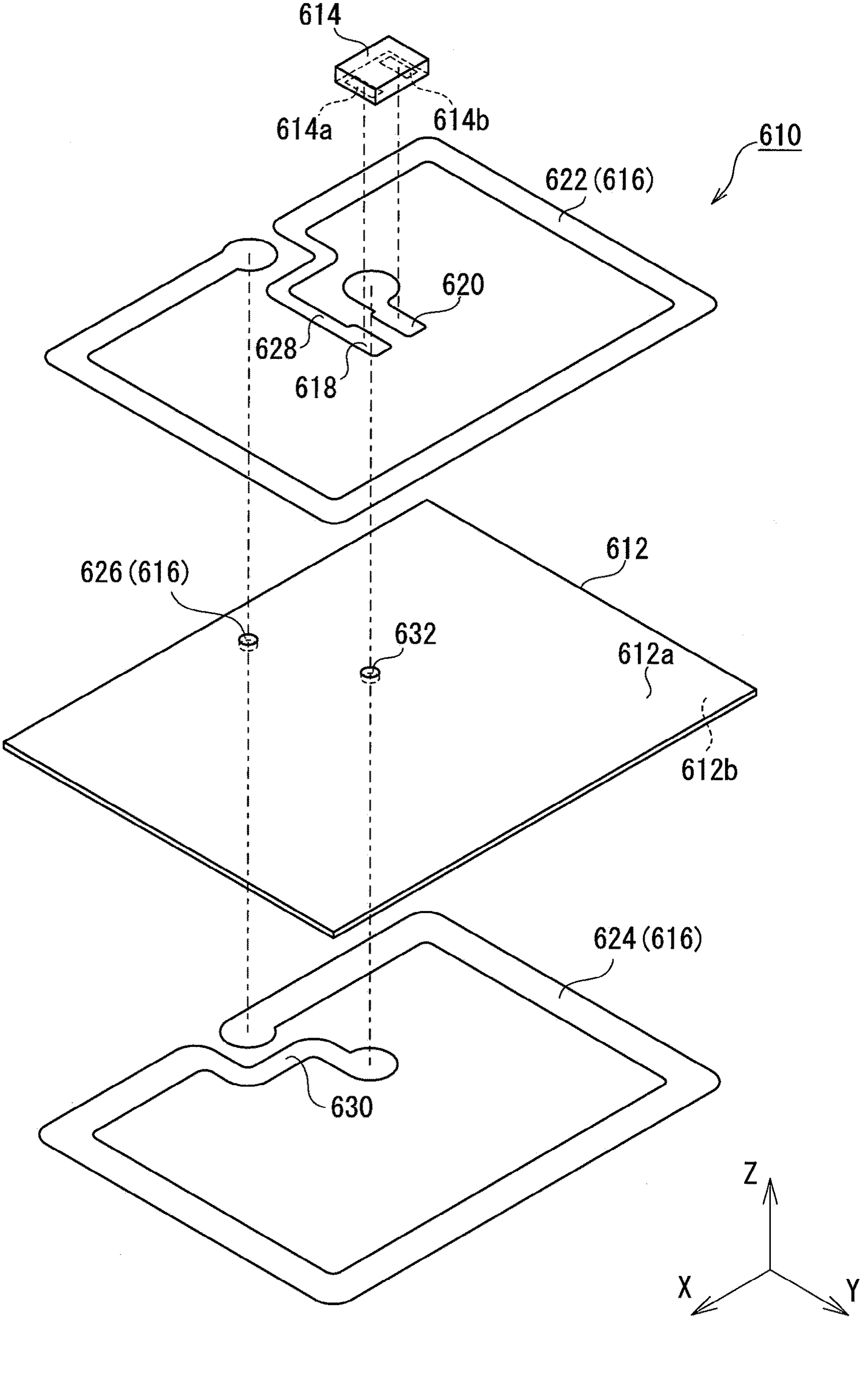
FIG. 15 is an exploded perspective view of the RFID tag according to the third exemplary embodiment.

FIG. 13 is a perspective view of an RFID tag according to a third embodiment of the present disclosure. FIG. 14 is a top view of the RFID tag according to the third embodiment. FIG. 15 is an exploded perspective view of the RFID tag according to the third embodiment.

As shown in FIG. 13 to FIG. 15, an RFID tag 610 according to the third embodiment includes a base material 612, an RFIC chip 614, and a coil conductor 616. The coil conductor 616 includes a first spiral conductor 622 provided on a first surface 612*a* of the base material 612, a second spiral conductor 624 provided on a second surface 612*b* of the base material 612, and an interlayer connection conductor 626 that electrically connects one end of the first spiral conductor 622 and one end of the second spiral conductor 624.

A first connection conductor 628 that electrically connects another end of the first spiral conductor 622 and a first terminal 614*a* of the RFIC chip 614, is provided on the first surface 612*a* of the base material 612. The first connection conductor 628 is electrically connected to the first terminal 614*a* of the RFIC chip 614 via a first land conductor 618.

A second connection conductor 630 that electrically connects another end of the second spiral conductor 624 and a second terminal 614*b* of the RFIC chip 614, is provided on the second surface 612*b* of the base material 612. The second connection conductor 630 is electrically connected to the second terminal 614*b* of the RFIC chip 614 via an interlayer connection conductor 632 and a second land conductor 620.

The first connection conductor 628 and the second connection conductor 630 overlap each other on the base material 612 in plan view (when viewed in the Z-axis direction). Moreover, the first connection conductor 628 and the second connection conductor 630 cross each other (e.g., intersect each other), unlike the first connection conductor 28 and the second connection conductor 30 of the first embodiment. Thus, a gap is formed between a portion of the first connection conductor 628 and a portion of the second connection conductor 630 which extend between a crossover part and the RFIC chip 614. Due to this gap, magnetic fields generated from these respective portions of the first connection conductor 628 and the second connection conductor 630, cannot cancel each other out. However, since magnetic fields generated in the crossover part can cancel each other out, the communication distance is longer than that in the case where the first connection conductor and the second connection conductor do not overlap at all (for example, in the case of the first and second comparative examples described above).

Also with the RFID tag 610 of the third embodiment, as with the RFID tag 10 of the first embodiment, the communication distance can be prevented from decreasing while electrically connecting the coil conductor 616 and the RFIC chip 614.

It is noted that the exemplary aspects of the present disclosure have been described above with reference to a plurality of embodiments, but the embodiments of the present disclosure are not limited thereto.

In the case of the first embodiment, for example, as shown in FIG. 3, the coil conductor 16 is composed of the first spiral conductor 22 provided on the first surface 12*a* of the base material 12, and the second spiral conductor 24 provided on the second surface 12*b* of the base material 12. The embodiments of the present disclosure, however, are not limited to this configuration. For example, the coil conductor may be made of a spiral conductor formed on only one surface of the first and second surfaces of the base material.

Specifically, various aspects of the present disclosure are as follows.

A first aspect is an RFID tag including a base material that includes a first surface and a second surface opposite to the first surface; a coil conductor that includes a first spiral conductor provided on the first surface of the base material, a second spiral conductor provided on the second surface of the base material, and an interlayer connection conductor extending through the base material and electrically connecting one end of the first spiral conductor and one end of the second spiral conductor; an RFIC chip that is provided on the base material such that the RFIC chip is positioned in an opening of the coil conductor in plan view of the base material, and that includes a first terminal and a second terminal; a first connection conductor that is provided on the first surface of the base material, and electrically connects another end of the first spiral conductor and the first terminal of the RFIC chip; and a second connection conductor that is provided on the second surface of the base material, and electrically connects another end of the second spiral conductor and the second terminal of the RFIC chip. The first connection conductor and the second connection conductor at least partially overlap each other in the plan view of the base material.

A second aspect is the RFID tag according to the first aspect, portions overlapping each other, of the first connection conductor and the second connection conductor, extend in an identical direction in the plan view of the base material.

A third aspect is the RFID tag according to the first aspect, the first connection conductor and the second connection conductor cross each other in the plan view of the base material.

A fourth aspect is the RFID tag according to any one of the first to third aspects, further including: a first land conductor that is provided on the first surface of the base material, and electrically connected to, while facing, the first terminal of the RFIC chip; and a second land conductor that is provided on the first surface of the base material, and electrically connected to, while facing, the second terminal of the RFIC chip, the first connection conductor is electrically connected to the first land conductor, and the second connection conductor is electrically connected to the second land conductor.

A fifth aspect is the RFID tag according to the fourth aspect, further including a land support conductor that is provided on the second surface of the base material such that the land support conductor faces both of the first land conductor and the second land conductor in the plan view of the base material, and that supports the first land conductor and the second land conductor.

A sixth aspect is the RFID tag according to the fifth aspect, the land support conductor is a part of the second connection conductor.

In the RFID tags according to the embodiments of the present disclosure, the first connection conductor and the second connection conductor at least partially overlap each other in plan view of the base material, so that the magnetic field generated from the first connection conductor and the magnetic field generated from the second connection conductor cancel each other out. The magnetic fields, however, can cancel each other out without the first connection conductor and the second connection conductor overlapping each other. Specifically, when the first connection conductor and the second connection conductor at least include portions extending in an identical direction in parallel with each other at a predetermined distance, and the predetermined distance is small, then, the magnetic field generated from the first connection conductor and the magnetic field generated from the second connection conductor substantially cancel each other out. The predetermined distance is a distance smaller than widths of the first and second connection conductors, for example. In the first embodiment, when the first connection conductor and the second connection conductor overlap each other in plan view of the base material, capacitance is formed between the first and second connection conductors. This capacitance can reduce inductance of the coil conductor, that is, reduce the number of turns of the coil conductor. This enables the RFID tag to be downsized, which is advantageous.

In general, the exemplary aspects of the present disclosure are applicable to an RFID tag having a coil conductor and an RFIC chip disposed in an opening of the coil conductor.

What is claimed:

1. An RFID tag comprising:

a base material that includes a first surface and a second surface opposite to the first surface;

a coil conductor that includes a first spiral conductor on the first surface of the base material, a second spiral conductor on the second surface of the base material, and an interlayer connection conductor that extends through the base material and electrically connecting the first spiral conductor to the second spiral conductor;

an RFIC chip on the base material and positioned in an opening of the coil conductor in a plan view of the base material, the RFIC chip including a first terminal and a second terminal;

a first land conductor on the base material and that overlaps the first terminal of the RFIC chip in the plan view, and that is electrically connected to the first terminal;

a second land conductor on the base material and that overlaps the second terminal of the RFIC chip in the plan view, and that is electrically connected to the second terminal;

a first connection conductor on the first surface of the base material and that electrically connects the first spiral conductor to the first land conductor;

a second connection conductor on the second surface of the base material and that electrically connects the second spiral conductor to the second land conductor; and a land support conductor on the second surface of the base material and that overlaps in the plan view with at least a part of the first land conductor, at least a part of the second land conductor, at least a part of the first terminal, and at least a part of the second terminal, and that supports the first and second land conductors, wherein the first connection conductor and the second connection conductor at least partially overlap each other in the plan view of the base material.

2. The RFID tag according to claim 1, wherein the interlayer connection conductor connects a first end of the first spiral conductor to a first end of the second spiral conductor.

3. The RFID tag according to claim 2, wherein:

the first connection conductor connects a second end of the first spiral conductor to the first terminal of the RFIC chip; and the second connection conductor connects a second end of the second spiral conductor to the second terminal of the RFIC chip.

4. The RFID tag according to claim 1, wherein respective portions of the first and second connection conductors that overlap each other extend in an identical direction in the plan view of the base material.

5. The RFID tag according to claim 1, wherein the first connection conductor and the second connection conductor cross each other in the plan view of the base material.

6. The RFID tag according to claim 5, wherein a gap is provided between a portion of the first connection conductor and a portion of the second connection conductor that extends between a crossover part and the RFIC chip.

7. The RFID tag according to claim 1, wherein the land support conductor is a part of the second connection conductor.

8. The RFID tag according to claim 1, wherein portions of the first and second connection conductors that overlap each other extend linearly in a direction in the plan view of the base material.

* * * * *